US005637354A

United States Patent [19]

Segalla

[11] Patent Number: 5,637,354

[45] Date of Patent: Jun. 10, 1997

[54] METHOD AND LIQUID COMPOSITION FOR THE PRODUCTION OF INDELIBLE SCRIPT ON A PAPER SUBSTRATE

[76] Inventor: Gabriele Segalla, 37019 Peschiera Del Garda Via Milano, 70/R2-D5, Verona, Italy

[21] Appl. No.: 313,085

[22] PCT Filed: Mar. 29, 1993

[86] PCT No.: PCT/EP93/00762

§ 371 Date: Nov. 14, 1994

§ 102(e) Date: Nov. 14, 1994

[87] PCT Pub. No.: WO93/20160

PCT Pub. Date: Oct. 14, 1993

[30] Foreign Application Priority Data

Apr. 2, 1992 [IT] Italy ................................ MI92A0801

[51] Int. Cl.$^6$ .............................. B05D 1/36; B05D 3/10; C09D 11/16; C09D 11/20

[52] U.S. Cl. .......................... 427/258; 427/288; 427/337; 106/31.28

[58] Field of Search .................................... 427/258, 265, 427/288, 301, 326, 273, 337; 8/181, 406, 435, 408; 106/20 R, 21 A, 23 B, 23 R; 101/491

[56] References Cited

U.S. PATENT DOCUMENTS

| | | | |
|---|---|---|---|
| 3,950,290 | 4/1976 | Drury, Jr. et al. | 206/23 EM |
| 4,654,082 | 3/1987 | Frilette | 106/30 |
| 5,006,127 | 4/1991 | Tennigkeit et al. | 8/406 |
| 5,141,556 | 8/1992 | Matrick | 106/20 |

*Primary Examiner*—Shrive Beck
*Assistant Examiner*—Fred J. Parker
*Attorney, Agent, or Firm*—Sheridan Ross P.C.

[57] ABSTRACT

A method for the production of indelible script on a paper substrate provides for the introduction of at least one highly penetrating coloring compound having at least two reactive functional groups into the substrate. An oxidation dye in the script is subjected to oxidative polymerization within the paper substrate itself. A liquid composition is disclosed having a solution of at least one oxidation dye with functional groups in a concentration of 0.01% to 40% by weight, such solution including up to 80% by weight of a suspension of carbon black and a solution of an oxidant.

11 Claims, No Drawings

METHOD AND LIQUID COMPOSITION FOR THE PRODUCTION OF INDELIBLE SCRIPT ON A PAPER SUBSTRATE

FIELD OF THE INVENTION

The present invention relates to a method and to a liquid composition for the production of protected, indelible script on a paper substrate.

BACKGROUND AND SUMMARY OF THE INVENTION

It is well known that ink script can be removed, even if only partially, when it is subjected to suitable chemical or physical action such as, for example, abrasion by bladed instruments or fine points, decolouration with suitable oxidising/reducing agents (including the common "ink-eradicators"), laser light, etc.

It is equally well known that there are recognised solvents or mixtures of solvents which are able to remove script, whatever ink has been used, without etching into the substrate to which it has been applied and hence without leaving any obvious trace of the removal.

In order to protect ink script, particularly but not exclusively on official documents, bank cheques and other similar documents, from accidental or intentional removal, particularly when this is unauthorised, many techniques and devices have been proposed among which are the covering of the script with a transparent film which is extremely adhesive to the paper substrate, which is unaffected by the type of ink used for the script itself and which is insoluble in the solvents for such ink.

However, at least with regard to intentional unauthorised deletion, the techniques and devices adopted up till now have had limited success over time and in the field of application, that is, they have been useful until countermeasures have been found to overcome their protectiveness.

A need has therefore been felt to prevent ink script whether effected manually with a fountain pen, ballpoint pen, felt pen, stamp or the like, or mechanically with a printer, ink jet printer, post marking machine or the like, from being deleted, even only partially, either accidentally or intentionally.

DESCRIPTION OF THE PREFERRED EMBODIMENT

The problem at the root of the invention described above is therefore that of providing a method and a composition which enable script on a paper substrate to resist unauthorised, intentional attempts to remove it.

This problem is solved according to the invention by a method of the type indicated above which is characterised in that it includes the steps of:

- marking a script on the substrate with a solution of at least one colouring compound with a high penetrability into the substrate and constituted by molecules having at least two reactive functional groups;
- subjecting the colouring compound in the script to polymerisation within the substrate.

The colouring compounds of the invention are selected from those having at least two reactive functional groups in their molecules and having a high power to penetrate the paper substrate, that is which are able to penetrate between the cellulose fibrils forming the structure of the paper substrate by virtue of their low molecular weights and their relatively small molecular dimensions.

Thanks to the presence of at least two reactive functional groups, the colouring compounds of the present invention are able to form polymeric chains within the fibrous matrix of the substrate when treated with suitable oxidising agents.

Multi-functional colouring compounds which are particularly advantageous for the purposes of the invention are the so-called oxidation dyes.

The colouring compounds of the invention may be selected from oxidation dyes which incorporate at least two amino or phenolic functional groups, in particular: diaminobenzenes, diaminotoluenes, naphthols, polyphenols, aminophenols, diaminopyridines and their mixtures.

The diaminobenzenes which are particularly effective in the production of scripts according to the present invention are as follows: p-phenylenediamine; m-phenylenediamine; o-phenylenediamine; N-phenyl-p-phenylenediamine; 2-nitro-p-phenylenediamine; 5-nitro-m-phenylenediamine; 4-nitro-m-phenylenediamine; 4-nitro-o-phenylenediamine; N,N-bis(2-hydroxyethyl)-phenylenediamine; 2-chloro-p-phenylenediamine; 4-chloro-o-phenylenediamine; N, N-dimethyl-p-phenylenedamine; 4-ethoxy-m-phenylenediamine; 2-Nitro-N'phenyl-1,4-benzodiamine; 2,4-diaminodiphenylamine; 2-aminodiphenylamine; 4,4'-diaminodiphenylamine; p-aminodiphenylamine; 4-hydroxydiphenylamine; $N_1$-(2-hydroxyethyl)-2-nitro-p-phenylenediamine; $N_1$-tris(hydroxymethyl)methyl-4-nitro-o-phenylenediamine; N-methoxyethyl-p-phenylenediamine; 4-methoxy-m-phenylenediamine; 2-methoxy-p-phenylenediamine; 1,2,4-triaminobenzene; 2,4-diaminoanisol; 5-chloro-2-nitro-p-phenylenediamine; p-toluylenediamine; 3,4-toluylenediamine; o-toluylenediamine; xylylenediamine; 1,2,4-triaminobenzene dihydrochloride; p-aminophenylglycine; 2,5-diaminophenol; p-aminoacetanilide; p-aminodimethylaniline; p-aminodiethylaniline.

With regard to the diaminotoluenes, those particularly effective were: Toluen-2,5-diamine; 2,5-diamino-1,4-xylylene; 2-amino-5-diethylaminotoluene; 4-methoxytoluen-2,5-diamine(hydrochloride)

Of the naphthols, those particularly effective were as follows: 1-naphthol; 2-naphthol; 1,5-naphthalene diol; 2,3-dihydroxynaphthalene.

With regard to the polyphenols, the preferred were: hydroquinone; resorcinol; pyrocatechol; pyrogallic acid; fluoroglucinol; 4-chlororesorcinol.

Of the aminophenols, those particularly effective were as follows: 2-amino-4-nitrophenol; 3-amino-4-nitrophenol; 2-amino-5-nitrophenol; 4-amino-2-nitrophenol; 4-amino-3-nitrophenol; 2-amino-5-methylphenol; 2-amino-4-methylphenol; 4-amino-2-methylphenol; 4-amino-3-methylphenol; 3-aminophenol; 2-aminophenol; 4-aminophenol; 2-amino-6-chloro-4-nitrophenol; 3-aminocresol; 4-aminocresol; 2,4-diaminophenol; 2,4-diaminophenoxyethanol; N,N-diethyl-m-aminophenol; 2-nitro-4'-hydroxyphenylamine; N, O-di(2-hydroxyethyl)-2- amino-5-nitrophenol; N-hydroxyethyl-2-amino-4-hydroxytoluene; p-methylaminophenol; 2-methyl-5-hydroxyethylamino-phenol; 3-nitro-4-aminophenoxyethanol; 2-nitro-N-hydroxyethyl-p-anisidine; 2,4-dinitro-6-aminophenol (picramic acid); 2,4,6-triaminophenol; 4-amino-2-hydroxytoluene; N,n-butyl-p-aminophenol; 2-amino-4,6-dinitrophenol; 2-nitro-p-cresol; 2-nitrohydroquinone; 1,3,5-trihydroxy-2-nitrobenzene; 3,5-dinitrohydroquinone; 2,6-dinitro-4N-methylaminophenol; 2,6-dinitro-4-dihydroxyethylaminophenol; 2,6-dimethyl-p-aminophenol; 2,6-dibromo-p-aminophenol.

Finally, with regard to the diaminopyridines, the best results were obtained with: 2,3-diaminopyridine; 2,4-diaminopyridine; 2,5-diaminopyridine; 2,6-diaminopyridine; 3,4-diaminopyridine; 3,5-diaminopyridine.

The said oxidation dyes may be used either individually or in mixtures with each other.

It has been found that the optimum resistance to attempts at deletion of script made by the method of the present invention have been obtained with the use of mixtures of dyes having the functional groups —$NH_2$ or —OH in the meta and para positions, such as, for example, mixtures of p-phenylenediamine and n-phenylenediamine.

These mixtures, through polymerisation in situ, give rise to compounds which remain in the paper substrate even if this is subjected to vigourous treatment with the more common agents used to remove ink script.

The resistance to removal of the script thus achieved is so high that the script is not removed even when the fibres of the paper substrate start to break up and are damaged irreparably.

It is thought that this resistance is due to the fact that the mixtures of colouring compounds polymerise with the formation of substantially insoluble polymers which are trapped in the fibrous structure of the paper substrate.

It is plausible to think that the trapping of the polymers in the cellulose matrix of the substrate is further increased by the formation of chemical/physical bonds with the molecules of the cellulose matrix itself, for example by means of hydrogen bridges.

In accordance with the invention, the colouring compounds of the present invention are carried in depth into the substrate with the use of suitable solvents as vehicles, such as mixtures of water, alcohols, glycols, glycol-ethers, the solutions including from 0.01% to 40% by weight of one or more colouring compounds.

Among the solvents which are useful for the purposes of the invention may be listed aqueous solutions made alkaline with sodium hydroxide, alcohols having from one to five carbon atoms, glycerol, glycols, such as for example ethylene glycol, propylene glycol, oxyalcohols such as for example carbitol, alkyl ethers of glycols such as for example glycol methyl ether, glycol ethyl ether, diethylene glycol, glycol butyl ether, propylene glycol methyl ether, methyl carbitol and butyl carbitol, or mixtures of the said compounds.

For the purposes of the invention, the optimum results are achieved with the use of mixtures, for example, of water, ethanol, glycols such as, for example, propylene glycol, ethylene glycol and diethylene glycol, alkyl ethers of glycols and glycerol.

The use of these mixtures, preferably including from 10 to 85% of alcohol and from 15 to 90% of glycols or glycol-derivatives gives the advantage of avoiding excessive diffusion or dispersion of the molecules of the colouring compound over the surface of the paper substrate with a consequent loss of definition in the script: moreover it enables greater penetration of the molecules into the fibrous matrix of the paper, thus achieving a script having a greater resistance to mechanical surface abrasion.

By mixing the solvents suitably, in a conventional manner, it is also possible to regulate the viscosity of the solution of the colouring compounds to achieve the optimum value for the selected mode of formation of the script, such as with a fountain pen, ballpoint pen, felt pen, fine liner, etc. The use, for example, of mixtures of monoethylene glycol, diethylene glycol, propylene glycol methyl ether and glycerol gives the further advantage, in the case of solutions for use with fountain pens or fine liners, of avoiding the so-called "dry out" phenomenon of the colouring solution in the writing tip.

The solution of colouring compounds may possibly include other colouring substances which are soluble in the selected solvent so as to make the script formed on the paper substrate more evident.

It is also been found that modest quantities of carbon black in suspension (carbon black of the type commonly used in india inks), when added to the colouring solution, are not only carried into the paper substrate by the said solvents but are also able to increase the resistance of the script made by the method of the present invention to decolourising agents.

Quantities of up to 40 to 80% by weight of suspensions of carbon black (according to their pigment concentration) also give the advantage of reducing the quantity of colouring compound needed to obtain indelible script.

It is thought that this phenomenon can be imputed to the encapsulation and "fixing" of the carbon black particles in the polymeric structure formed by the colouring compounds, with an increase in the chemical inertia of the latter.

The solution of the colouring compound may also include conventional antioxidants/stabilising agents, such as, BHT, BHA, sulphites, hydrosulphites, thioglycolic acid, etc, as well as preservatives such as, sodium trichlorophenate, artificial moss, cumarin, etc in order to prolong the shelf life of the solution itself. The addition of tannic acid may in its turn increase the resistance of the script to light and water. The presence of UV-protective agents such as 3-benzophenone may limit the oxidation of the colouring compound by light during shelf life of a solution as far as possible.

The step of polymerising the colouring compounds is carried out by oxidation with oxidising substances or by suitable physical means such as UV radiation which can generate ozone locally which acts as the oxidant.

Among the oxidants which are particularly effective are solutions of sodium hypochlorite, potassium permanganate, potassium bichromate, hydrogen peroxide, benzoyl peroxide, chlorate, persulphates, iodates, perborates, urea peroxide and their mixtures. These oxidants may be in aqeuous solution or dissolved in a suitable organic solvent.

When the oxidants are in aqueous solution it is preferable for this solution to contain a quantity of between 0.05 and 50% by weight of the total weight of the solution.

When, however, the oxidants, as in the case for example of benzoyl peroxide, are dissolved in an organic solvent, it is preferable for them to be present in quantities of between 0.05 and 10% by weight of the total weight of the solution.

Among the organic solvents which are compatible with the oxidants, the preferred ones are aliphatic hydrocarbons having from six to thirteen carbon atoms, butyl phthalate, benzyl benzoate, propylene glycol methyl ether, butyl acetate, ethyl acetate, chloroform, alcohols having from one to five carbon atoms and their mixtures.

Water repellent resins, such as ethyl cellulose, polyvinyl acetate, aceto-vinyl copolymers, polyacrylates, alkyde, maleic, polyamide resins, derivatives of colophony, may be added to the oxidising mixture obtained in order to create a thin water-repellent, protective film on the script.

In accordance with a first embodiment of the method of the invention, a script is first marked on the paper substrate with the use of a solution of at least one of the colouring compounds and then the solution including the oxidant is applied.

Both the solution of the colouring compound and the solution of the oxidant may be applied to the paper substrate by conventional means such as, for example the first by fountain pen, ballpoint pen, felt pen, fine liner; the second by means of a small brush, squeegee, spray system, pads, etc.

The present invention thus makes available a liquid composition including, as separate components:

a solution of at least one oxidation dye including at least two reactive functional groups;

a solution of at least one oxidant; for sequential use in the production of indelible script on a paper substrate.

In accordance with a second embodiment of the invention, the paper substrate may previously be subjected to a treatment with a suitably dilute solution of the oxidant.

For this purpose, the solutions preferably used are aqueous, alcoholic or aqueous-alcoholic solutions or solutions based on one of the organic solvents specified above (for example n-hexane) including from 0.01 to 5% by weight of the oxidant.

After drying, a substrate is obtained which incorporates the oxidant within its cellulose matrix so that, after a script has been marked with a solution of the oxidation dyes, the polymerisation reaction may occur in situ in a rapid and effective manner.

Again in this case, the solution of the oxidant may be applied to the paper substrate in a manner known per se, for example by immersion, spraying, etc.

After evaporation of the solvent, a paper substrate is obtained which is usable for the production of documents such as, for example, bank cheques ready for use in accordance with the method of the present invention.

The formation of an indelible script in the substrate in this case occurs automatically with indubitable practical and economic advantages.

In each case, in accordance with the method of the invention, the oxidation occurs in only a few seconds and is completed in several minutes.

It is also observed that the polymerisation of the colouring compounds of the invention also results in dye toning which enables the course of the reactions to be seen, as well as portions of script to be obtained with a particular chromatic value. For example the oxidation/polymerisation of a mixture of p-phenylenediamine, m-phenylenediamine and 1,5-naphthalene diol results in dye toning from grey to blue-violet.

It is found that, once the polymerisation is completed, the particular chemical complexes which form in situ in the cellulose matrix of the paper substrate are almost insoluble in the common means used for the accidental or intentional deletion of script.

With the use of oxidation dyes, the method of the present invention has the further advantage that decolouring means including oxidants can only increase the degree of polymerisation of the colouring compounds used to a further extent so as to give the opposite effect from that desired.

Several examples of formulations of solutions of colouring compounds of the invention will now be given below by way of non-limitative example.

EXAMPLE 1

2 g of p-phenylenediamine, 2 g of m-phenylenediamine and 2 g of 1,5 naphthalene diol were dissolved in a mixture including 40 g of ethyl alcohol and about 53 g of propylene glycol.

1 g of a mixture of butylhydroxyanisol (BHA) and of 3-benzophenone was added to this mixture of solvents.

A solution was obtained which was used for the production of script according to the method of the invention with the aid of a fountain pen.

EXAMPLES 2 TO 10

Further solutions of colouring compounds of the invention were prepared in the manner given in Example 1 and had the compositions given below:

Example 2

| | Weight Percent |
|---|---|
| P-phenylenediamine | 2.5% |
| M-phenylenediamine | 2% |
| Resorcinol | 0.5% |
| 0-aminophenol | 0.2% |
| 1,5-Naphthalene | 0.5% |
| Ethyl alcohol | 40% |
| Antioxidants | 1% |
| 3-Benzophenone | 0.1% |
| Propylene glycol | q.s. to 100 |

Example 3

| | Weight Percent |
|---|---|
| P-phenylenediamine | 1.7% |
| 0-Aminophenol | 0.5% |
| M-phenylenediamine | 2% |
| 1-Naphthol | 0.5% |
| Hydroquinone | 0.05% |
| 1,5-Naphthalene diol | 0.5% |
| Isopropanol | 20% |
| Carbitol | 5% |
| Antioxidants | 1% |
| Benzophenone | 0.1% |
| Propylene glycol | q.s. to 100 |

Example 4

| | Weight Percent |
|---|---|
| P-phenylenediamine | 5% |
| M-phenylenediamine | 10% |
| 1,5 Naphthalene | 2% |
| Ethyl alcohol | 35% |
| Antioxidants | 1% |
| 3-Benzophenone | 0.1% |
| Propylene Glycol | q.s. to 100 |

Example 5

| | Weight Percent |
|---|---|
| P-phenylenediamine | 2% |
| M-phenylenediamine | 1.5% |
| Resorcin | 0.5% |
| Pelikan india ink (black N.17) | 2% |
| Ethyl alcohol | 60% |
| Antioxidants | 1% |
| 3-Benzophenone | 0.1% |
| Propylene glycol | q.s. to 100 |

Example 6

| | Weight Percent |
|---|---|
| Para-phenylenediamine | 2.08% |
| 4-methoxy-m-phenylenediamine | 1.25% |
| Sodium sulphite | 0.42% |
| EDTA | 0.42% |
| Glycerol | 2.50% |
| Diethylene glycol | 5.00% |
| Den. Ethyl alcohol 94° type A | 10.00% |
| Demin. water | 61.67% |
| Carbon black type F (Reinol) (with preservatives and non-ionic surfactants + acrylic resins) | 16.67% |

Example 7

| | Weight Percent |
|---|---|
| Para-phenylenediamine | 2.08% |
| 4-methoxy-m-phenylenediamine | 1.25% |
| Na sulphite | 0.42% |
| EDTA | 0.42% |
| Glycerol | 1.67% |
| Diethylene glycol | 8.33% |
| Monoethylene glycol | 4.17% |
| Den. Ethyl alcohol 94° type A | 10.00% |
| Demin. water | 55.00% |
| Carbon black type C (Reinol) (with preservatives and non-ionic surfactants + acrylic resins) | 16.67% |

Example 8

| | Weight Percent |
|---|---|
| Para-phenylenediamine | 2.08% |
| 4-methoxy-m-phenylenediamine | 1.25% |
| Na sulphite | 0.42% |
| EDTA | 0.42% |
| Glycerol | 10.00% |
| Diethylene glycol | 12.50% |
| Den. Ethyl alcohol 94° type A | 10.00% |
| Carbon black type F (Reinol) | 25.00% |
| Demin. water | q.s. to 100 |

Example 9

| | Weight Percent |
|---|---|
| Para-phenylenediamine | 2.08% |
| 4-methoxy-m-phenylenediamine | 1.25% |
| Na sulphite | 0.42% |
| EDTA | 0.42% |
| Glycerol | 10.00% |
| Propylene glycol methyl ether | 33.33% |
| Sorbitan (20) OE monolaurate | 2.00% |
| Carbon black type F (Reinol) | 30.00% |
| Demin. water | q.s. to 100 |

Example 10

| | Weight Percent |
|---|---|
| Para-phenylenediamine | 1.25% |
| Basf Ursol Echtscharz Black 320 1066 | 0.80% |
| Basf Ursol BC Grey | 1.25% |
| Basf Ursol EG | 0.20% |
| Na sulphite | 0.42% |
| EDTA | 0.42% |
| Glycerol | 1.00% |
| Propylene glycol methyl ether | 15.00% |
| Sorbitan (20) OE monolaurate | 2.00% |
| C B type F (Reinol) | 20.00% |
| Demineralized water | q.s. to 100 |

The formulations given above under Examples 1 to 10 were used for the production of indelible script by the method of the present invention both with the application of oxidant solutions to the substrate, drying of the substrate and then marking of the script with solutions of the dyes and with these steps being carried out in the reverse order as explained in the previous pages.

Solutions of oxidants used were: 0.5% solutions of benzoyl peroxide in n-decane, aqueous solutions with 5% by weight of sodium hypochlorite, aqueous solutions with 5% by weight of 12 volume hydrogen peroxide, aqueous solutions with 1% by weight of potassium chlorate.

Of the formulations of oxidant mixtures which were more effective and could be applied by a delivery device to the script and which did not produce blurring of the script itself, several examples are given by way of non-limiting example:

Example 11

| | Weight Percent |
|---|---|
| N-undecane | 75.00% |
| Butyl phthalate | 5.00% |
| PVP/Eicosene Copolymer | 5.00% |
| Benzyl benzoate | 13.00% |
| Benzoyl peroxide | 2.00% |

Example 12

| | Weight Percent |
|---|---|
| Butyl phthalate | 10.00% |
| PVP/Eicosene Copolymer | 5.00% |
| Benzyl benzoate | 13.00% |
| Propylene glycol methyl ether | 10.00% |
| Benzoyl peroxide | 2.00% |
| N-undecane | q.s. to 100 |

Example 13

| | Weight Percent |
|---|---|
| Ethyl phthalate | 20.00% |
| Ethyl cellulose | 0.50% |
| Benzyl benzoate | 10.00% |
| Benzoyl peroxide | 3.00% |
| Glycol ethyl ether | q.s. to 100 |

Scripts were thus obtained by polymerisation in situ which were incorporated in the polymeric matrix of the paper substrate and showed exceptional resistance to the following aggressive means for its removal (applied according to a somewhat exaggerated gradient but obviously such as not to damage the paper on which the ink had been applied irreparably and obviously):

mechanical abrasion by means of a universal rubber attack with bleaching preparations (based on potassium permanganate and sodium bisulphite)

attack with bleaching preparations (based on sodium hypochlorite and chlorine dissolved in water)

attack with 36 volume hydrogen peroxide (oxygenated water)

attack with hot concentrated caustic soda solution attack with a 15 weight percent solution of hydrofluoric acid attack with organic solvents such as chloroform, ethyl alcohol, isopropyl alcohol, benzyl alcohol, acetone, amyl acetate, butyl acetate, trichloroethylene, benzene, toluene, dimethylacetamide action by prolonged immersion in chloroform and subsequent application of a solution of ink eradicator (potassium permanganate and sodium bisulphite)

action by prolonged immersion in dimethylacetamide and subsequent application of a solution of ink eradicator (potassium permanganate and sodium bisulphite)

combinations of the methods and mechanical and physical aggressive agents listed above.

What is claimed is:

1. A method for the production of indelible script on a paper subtrate, comprising the steps of:

marking a script on the substrate by applying a solution of at least one oxidation dye that penetrates into the paper substrate and has at least two reactive functional groups, said reactive functional groups selected from the group consisting of amino and phenolic functional groups in a concentration of 0.01% to 40% by weight, said solution including up to 80% by weight of a suspension of carbon black, and subjecting said at least one oxidation dye in the script to oxidative polymerization within the paper substrate.

2. A method according to claim 1, wherein said at least one oxidation dye is selected from the group consisting of diaminobenzenes, diaminotoluenes, naphthols, polyphenols, aminophenols, diaminopyridines and their mixtures.

3. A method according to claim 2, wherein said at least one oxidation dye is selected from the group consisting of p-phenylenediamine; m-phenylenediamine; 1,5-naphthalene diol; 1-naphthol; o-aminophenol; resorcin; pyrogallol; hydroquinone; 4-methoxy-m-phenylenediamine and their mixtures.

4. A method according to claim 1, wherein the solution of said at least one oxidation dye includes a mixture of meta and para isomers.

5. A method according to claim 1, wherein said solution of said at least one oxidation dye includes at least one solvent selected from the group consisting of aqueous solutions of sodium hydroxide, alcohols having from one to five carbon atoms, glycerol, ethylene glycol, propylene glycol, 2-(2-ethoxyethoxy)ethanol, glycol methyl ether, glycol ethyl ether, glycol butyl ether, diethylene glycol, propylene glycol methyl ether, 2-(2-methoxyethoxy)ethanol, 2-(2-butoxyethoxy)ethanol and mixtures of said compounds.

6. A method according to claim 1, wherein said oxidative polymerization is achieved by applying a solution including an oxidant onto the script marked on the paper substrate.

7. A method according to claim 6, wherein said oxidant is selected from the group consisting of sodium hypochlorite, potassium permanganate, hydrogen peroxide, benzoyl peroxide, chlorates, persulphates, iodates, perborates, urea peroxide and their mixtures.

8. A method according to claim 6, wherein said solution is an aqueous solution.

9. A method according to claim 6, wherein the solution of said oxidant includes at least one organic solvent selected from the group consisting of aliphatic hydrocarbons having from six to thirteen carbon atoms, butyl phthalate, benzyl benzoate, propylene glycol methyl ether, butyl acetate, ethyl acetate, chloroform, alcohols having from one to five carbon atoms and their mixtures.

10. A method according to claim 8, wherein the solution includes from 0.05 to 50% by weight of said oxidant.

11. A method according to claim 9, wherein the solution includes from 0.05 to 10% by weight of said oxidant.

* * * * *